(12) United States Patent
Randria

(10) Patent No.: US 8,151,439 B2
(45) Date of Patent: Apr. 10, 2012

(54) METHOD FOR MOUNTING A MAGNETIC POLE AND ASSOCIATED ROTOR

(75) Inventor: Andry Randria, Besancon (FR)

(73) Assignee: Alstom Transport SA, Levallois-Perret (FR)

( * ) Notice: Subject to any disclaimer, the term of this patent is extended or adjusted under 35 U.S.C. 154(b) by 297 days.

(21) Appl. No.: 12/367,733

(22) Filed: Feb. 9, 2009

(65) Prior Publication Data
US 2009/0261676 A1 Oct. 22, 2009

(30) Foreign Application Priority Data
Feb. 8, 2008 (FR) .................................. 08 50804

(51) Int. Cl.
*H02K 15/02* (2006.01)
*H02K 15/10* (2006.01)
*H01F 3/00* (2006.01)
*H01F 41/02* (2006.01)
*H01F 3/04* (2006.01)
*H01F 7/06* (2006.01)

(52) U.S. Cl. ................. 29/598; 29/604; 29/607; 29/609

(58) Field of Classification Search ............... 29/598, 29/604, 607, 609; 310/156.28, 156.43, 156.38, 310/156.53
See application file for complete search history.

(56) References Cited

U.S. PATENT DOCUMENTS

| | | | | |
|---|---|---|---|---|
| 2002/0089249 A1* | 7/2002 | Sato et al. | ................. | 310/156.43 |
| 2002/0197179 A1* | 12/2002 | Billiet et al. | .................... | 419/10 |
| 2004/0169575 A1* | 9/2004 | Knauff et al. | ................. | 335/302 |
| 2006/0097595 A1* | 5/2006 | Randriamanantena | .. | 310/156.08 |
| 2006/0192455 A1* | 8/2006 | Shiao et al. | .............. | 310/156.22 |
| 2007/0200446 A1* | 8/2007 | Martin | ..................... | 310/156.43 |

FOREIGN PATENT DOCUMENTS

| | | |
|---|---|---|
| DE | 10 2006 004 537 | 8/2007 |
| EP | 0 996 212 | 4/2000 |
| EP | 1 315 267 | 5/2003 |
| EP | 1315267 A2 * | 5/2003 |
| EP | 1 439 626 | 7/2004 |
| EP | 1 605 574 | 12/2005 |
| EP | 1 646 126 A1 | 4/2006 |

* cited by examiner

*Primary Examiner* — David Angwin
(74) *Attorney, Agent, or Firm* — Davidson, Davidson & Kappel, LLC

(57) ABSTRACT

The present invention provides a method for mounting at least one magnetic pole of a rotor of a motor of a synchronous electrical rotating machine from elementary elements, the rotor including a hub. The method includes the following successive steps: forming the set of elementary elements of rectangular parallelepipedal shape by fixing at least two elementary elements to each other with an electrical insulator being interposed therebetween; the set of elementary elements being magnetizable; machining a main face of the set of elementary elements in order to form a cylindrical face having a radius substantially equal to the predefined radius of the hub; magnetizing the set of elementary elements; and fixing the set of elementary elements to the hub, the set of elementary elements forming at least a portion of the magnetic pole.

8 Claims, 4 Drawing Sheets

METHOD FOR MOUNTING A MAGNETIC POLE AND ASSOCIATED ROTOR

Priority is claimed to French Patent Application No. 08 50804 filed on Feb. 8, 2008 which is hereby incorporated by reference herein.

The present invention relates to a method for mounting a magnetic pole of a rotor for a synchronous electrical rotating machine, for example, an electric motor or an alternator.

BACKGROUND OF THE INVENTION

The document EP 1 646 126 describes a rotor comprising magnetic poles which are constituted by a plurality of separate permanent magnets which are separated from each other by an electrically insulating sheet which is interposed therebetween.

It is known to form such magnetic poles in accordance with the following steps, arranged in the order described.

Firstly, elementary elements of rectangular parallelepipedal shape are magnetised in order to form permanent elementary magnets. Subsequently, the elementary magnets are adhesively bonded beside each other with the electrically insulating sheet being interposed in a recess formed over the periphery of the hub of the rotor. The recess has a convex bottom. The elementary magnets are adhesively bonded to each other and to the convex bottom of the recess with the magnetic poles (north/south) thereof directed in the same directions.

However, the step of adhesively bonding the elementary magnets is very long because the elementary magnets are fixed to each other and they repel each other.

Since the planar surface of the elementary magnets is further fixed to a surface having a convex bottom, there are gaps which form fissures or faults which are tapered at the surface of the magnetic pole formed in this manner.

SUMMARY OF THE INVENTION

An object of the present invention is to provide a method for mounting a magnetic pole which is simpler and more rapid.

The present invention provides a method for mounting a magnetic pole of a rotor for a synchronous electrical rotating machine, wherein the method includes the following successive steps:

a) forming a set of elementary elements by fixing at least two elementary elements to each other with an electrical insulator being interposed therebetween, said elementary elements being magnetizable;

b) magnetizing the set of elementary elements;

c) fixing the set of elementary elements to the hub, said set of elementary elements forming at least a portion of the magnetic pole.

According to specific embodiments, the method for mounting at least one magnetic pole may include one or more of the following features, taken in isolation or together:

the set of elementary elements is of rectangular parallelepipedal shape and the method further includes a step of machining a main face of the set of elementary elements in order to form a cylindrical face which has a radius which is substantially equal to the radius (R) of the hub, said machining step being carried out before the magnetising step, the cylindrical face has a cylinder axis (X-X), the axis (X-X) being perpendicular to the longitudinal faces of the set of elementary elements and parallel with the lateral faces of the set of elementary elements, the elementary elements are fixed to each other by means of an adhesive and the electrical insulator is an electrically insulating sheet, the elementary elements are fixed to each other by means of an adhesive which is charged with solid particles or an adhesive which is charged with non-conductive material fibres, said adhesive forming the electrical insulator, the steps a) to c) are repeated in order to obtain a plurality of sets of elementary elements, said sets of elementary elements being fixed to the hub beside each other with an electrical insulator being interposed therebetween, a longitudinal face of a set of elementary elements forming a lateral face of the magnetic pole, a step of fixing an electrical insulator to the hub, the electrical insulator being interposed between the hub and said sets of elementary elements, a step of fixing an electrical insulator to the cylindrical face of the sets of elementary elements, the set of elementary elements comprises from 2 to 20 elementary elements.

The invention further provides a rotor for a synchronous electrical rotating machine comprising a hub, characterized in that at least one magnetic pole is constructed on the hub by the mounting method described above.

By way of a variant, the rotor constructed on the hub may include recesses whose bottom surface is planar, the set of elementary elements being fixed against the bottom surface.

BRIEF DESCRIPTION OF THE DRAWINGS

The invention will be better understood from a reading of the following description which is given purely by way of example and with reference to the drawings, in which.

DETAILED DESCRIPTION OF THE PREFERRED EMBODIMENTS

The present invention provides a method for mounting magnetic poles on a rotor of a synchronous electrical rotating machine. This method is described by way of example by magnetic poles 2, 4 being mounted on the rotor 6 of an electric motor 8. (FIG. 1).

Figure 1:
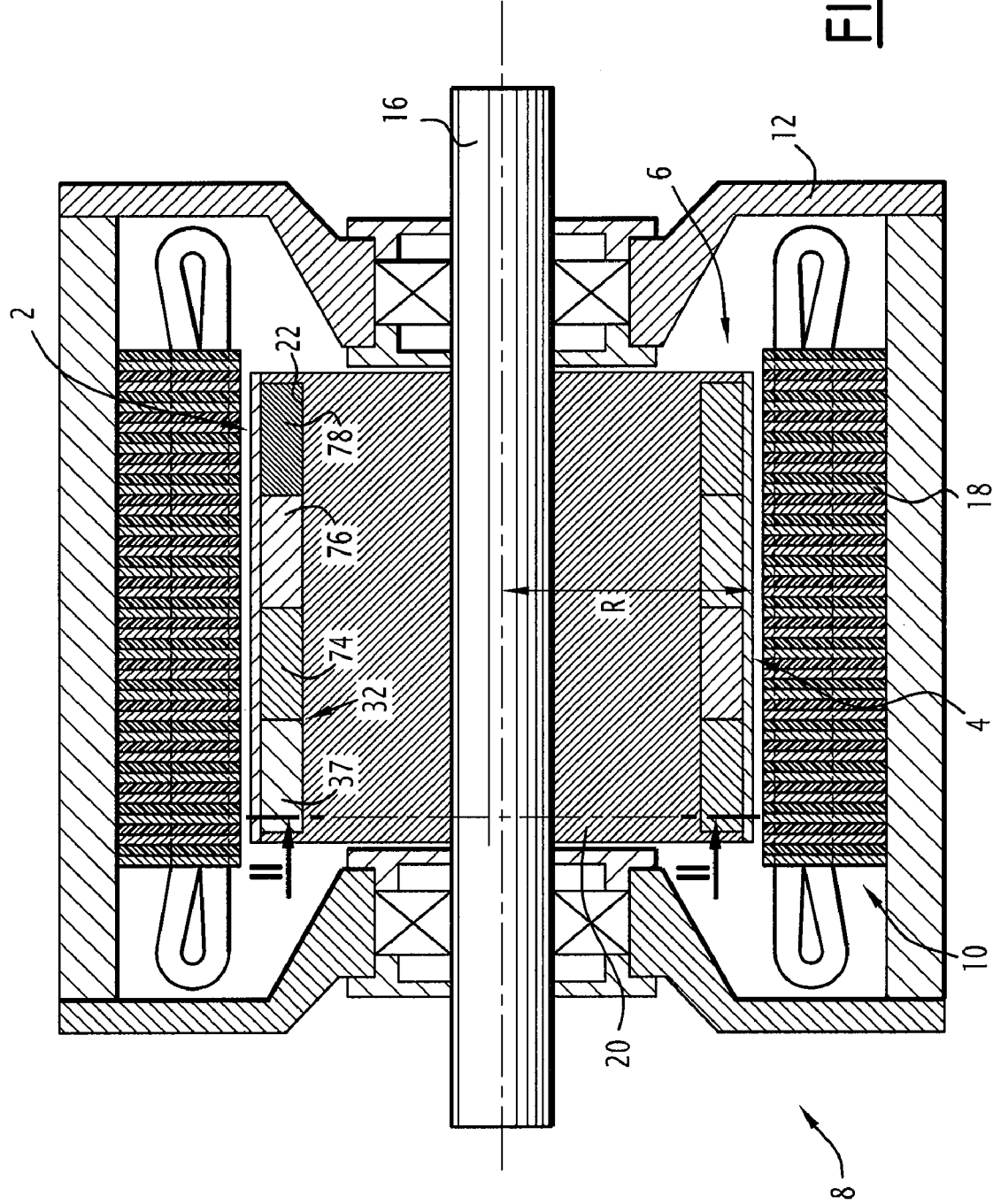
FIG. 1 is an axial section of an electric motor having permanent magnets comprising a rotor in accordance with the invention.

As illustrated in FIG. 1, the electric motor 8 includes a stator 10 which is fixedly joined to a casing 12, and a rotor 6 which is fixedly joined to a shaft 16.

The stator 10 surrounds the rotor 6 and includes windings 18 which are capable of generating a magnetic flux.

The rotor 6 includes a hub 20 which is fixed in terms of rotation to the shaft 16 by drive means, such as, for example, grooves. The hub 20 is of cylindrical outer shape having a predefined radius R. The hub 20 may be made exclusively from a metal or a metal alloy which conducts a magnetic field, in particular a ferromagnetic material.

Figure 2:
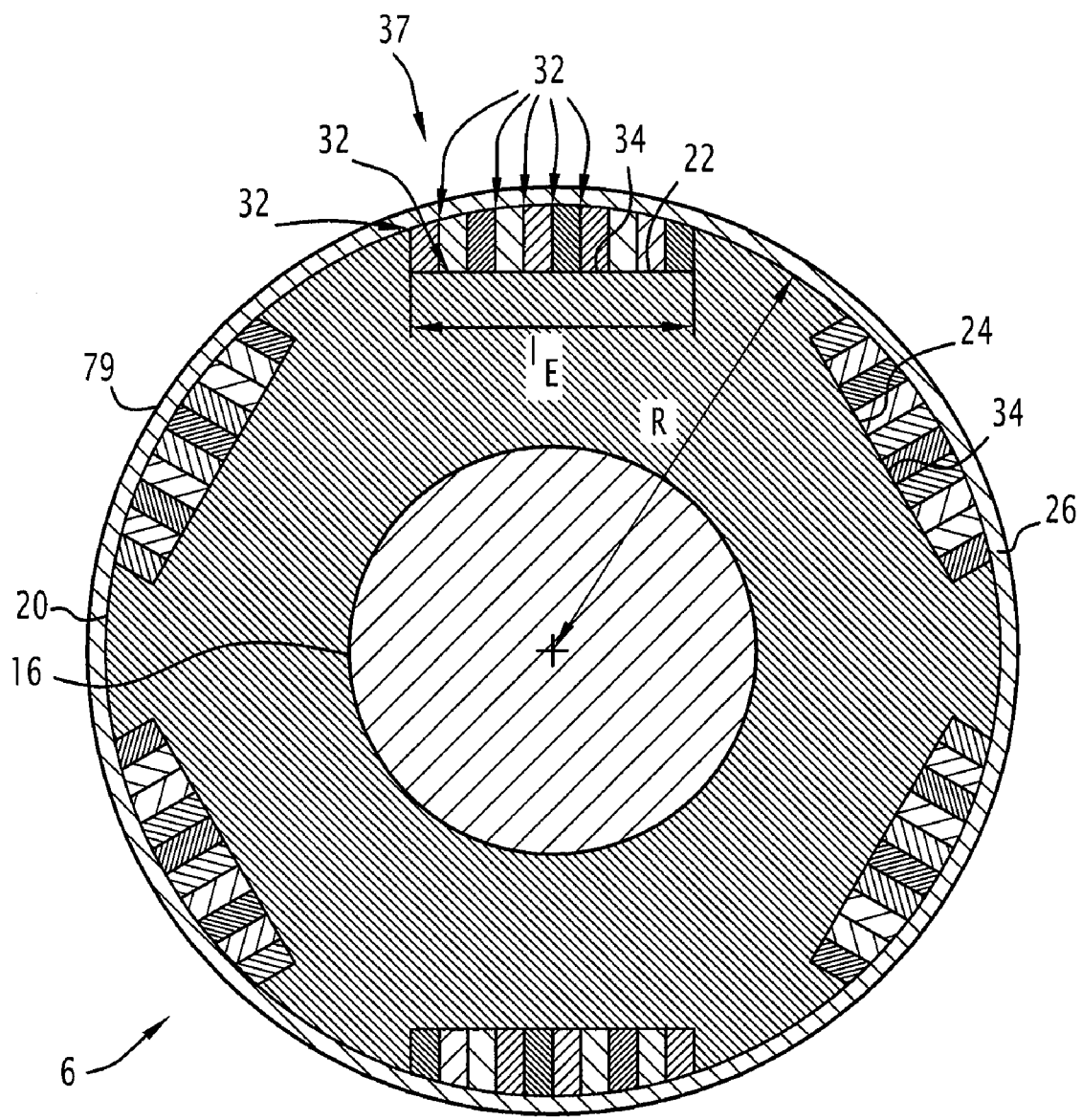
FIG. 2 is a sectional view taken in a plane II-II of the rotor of FIG. 1.

As shown in FIG. 2, recesses 22, 24 are formed over the periphery of the hub 20. The recesses 22, 24 are regularly spaced apart from each other.

The recesses 22, 24 are intended to receive permanent magnets in order to constitute the magnetic pole 2.

The recesses 22, 24 have a flat bottom wall 34. The recesses 22, 24 have a width and a length which are equal to the width $l_E$ and the length $L_E$ of the magnetic pole 2.

Figure 3:
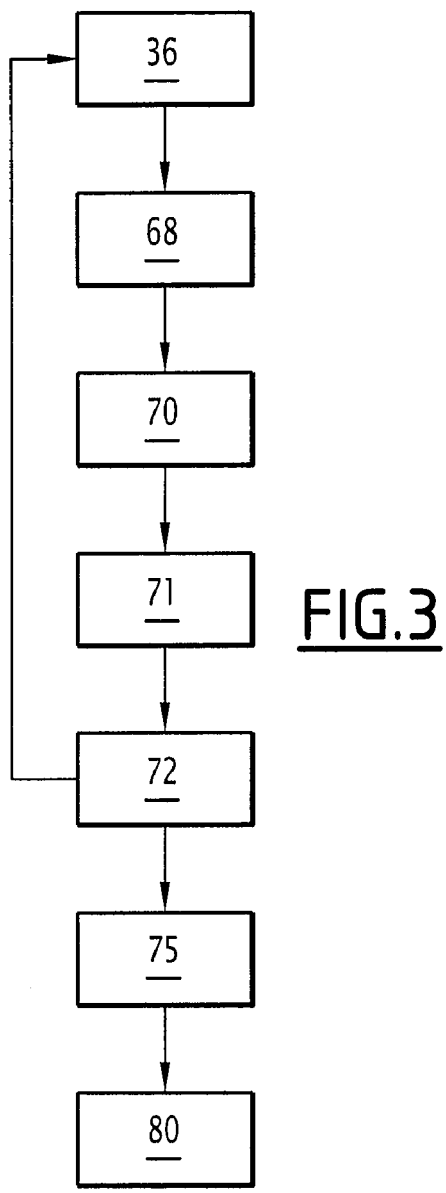
FIG. 3 is a flow chart illustrating the steps of the method for mounting a magnetic pole according to the invention.

The method for mounting a magnetic pole 2 according to the invention is illustrated in FIG. 3. It starts with a step 36 of forming a set 37 of elementary elements by adhesively bonding elementary elements 38, 40 to each other with an electrical insulator 32 in the form of a sheet being interposed, this being referred to below as an insulating sheet 32.

Each elementary element 38, 40 is formed from a magnetizable material such as a magnetically hard material.

Figure 5:
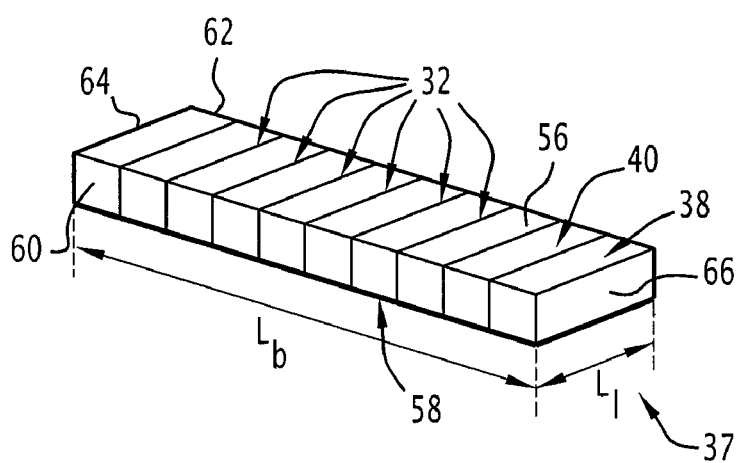
FIG. 5 is a perspective view of a set of elementary elements.
Figure 6:
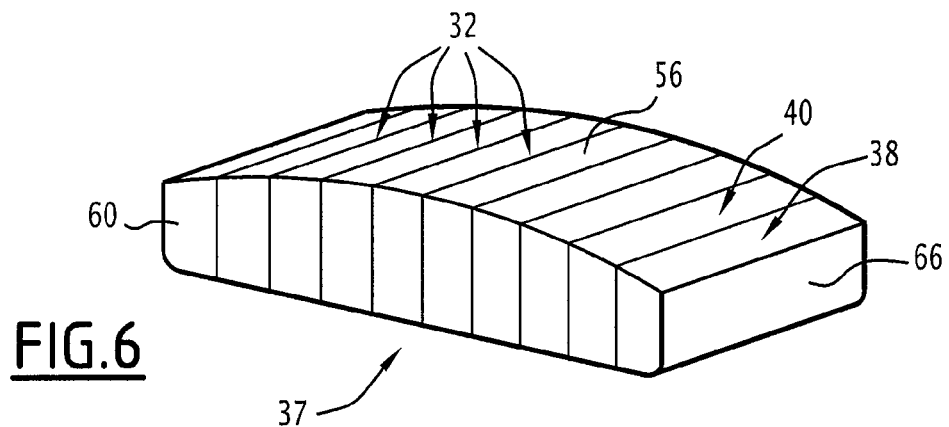
FIG. 6 is a perspective view of the set of FIG. 5 after machining.
Figure 7:
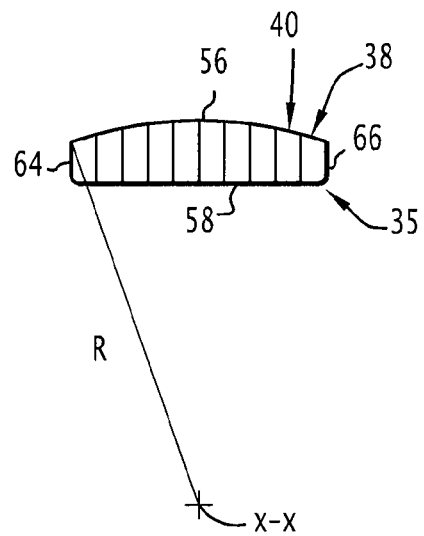
FIG. 7 is a side view of the set of FIG. 6.
Figure 8:
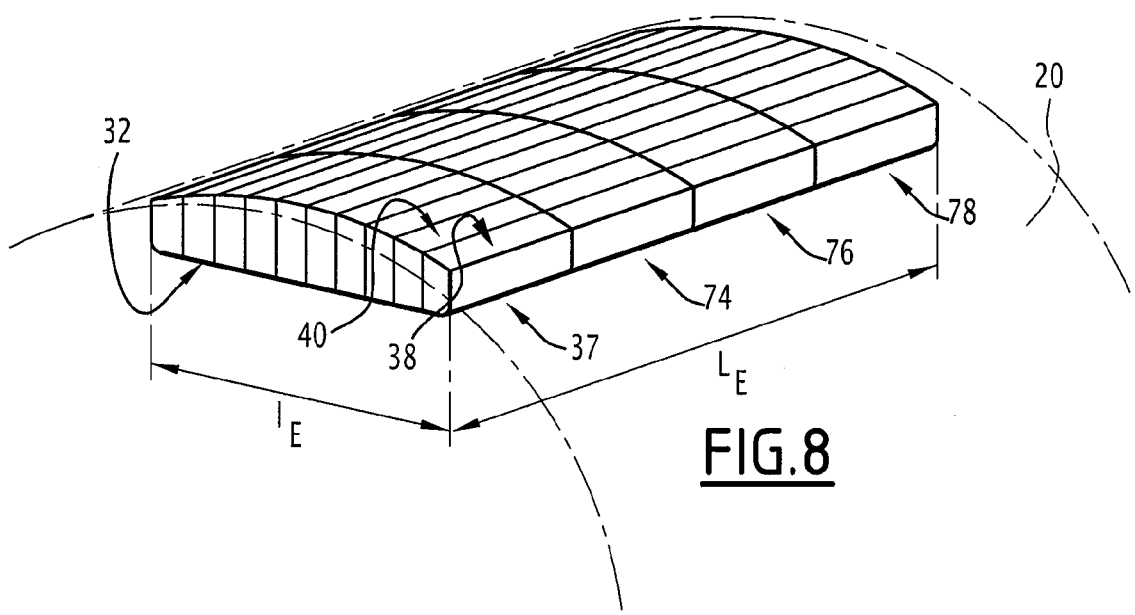
FIG. 8 is a perspective view of four sets of elementary elements which are fixed in a recess of a rotor.

A plurality of elementary elements, for example, between 1 and 20, preferably between 6 and 10, are adhesively bonded to each other in order to form the set 37. (FIG. 5).

Figure 4:
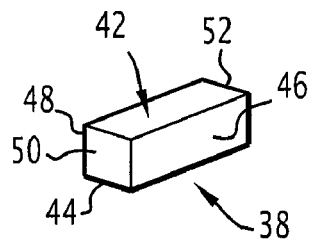
FIG. 4 is a perspective view of an elementary element.

As is visible in FIG. 4, each elementary element 38 is of rectangular parallelepipedal shape having two main faces 42, 44, two longitudinal faces 46, 48 and two lateral faces 50, 52.

Elementary element 38 has, for example, a width of 6 mm, a length of from 30 to 60 mm and a thickness of approximately 15 mm.

The main face 42, 44 of an elementary element has a width which is, for example, from 0.05 to 1 times the width $l_E$ of the magnetic pole 2.

The main face 42, 44 of an elementary element has a length which is, for example, from 0.05 to 1 times the length $l_E$ of a magnetic pole 2.

All of the surface of the longitudinal faces 46, 48 of each elementary element 38, 40 is fixed to all of the surface of each insulating sheet 32 so that the set 37 forms a solid block which is in one piece. In this manner, the outer surface of the set 37 is continuous. The set 37 does not include any faults or fissures.

The insulating sheet 32 allows the magnets to be electrically insulated from each other in order to reduce the electrical losses arising from the passage of eddy currents which are induced by the magnetic fluxes which pass between the rotor and the stator.

The insulating sheet 32 does not prevent the passage of the magnetic fluxes.

The insulating sheet 32 is constructed, for example, from a paper which is composed of meta-aramide fibers known as "Nomex" (registered mark) or a polyimide film known as "Kapton" (registered mark), or any other electrically insulating material such as a pure or charged technical polymer.

The insulating sheet 32 is of small thickness (for example, 20 μm) relative to the thickness of the elementary elements 38, 40.

As shown in FIG. 5, the set 37 is of rectangular parallelepipedal shape. It has two main faces 56, 58, two longitudinal faces 60, 62 and two lateral faces 64, 66.

The length $L_b$ of a longitudinal face 60 of the set 37 is equal to the width $l_E$ of the magnetic pole 2. The length $L_l$ of a lateral face 64, 66 of the set 37 is equal to 0.05 to 1 times the length $L_E$ of the magnetic pole 2.

Subsequently, during a machining step 68, a main face 56 of the set is machined in such a manner that the face has a cylindrical shape having a radius R equal to the radius R of the hub 20 which is intended to receive the set 37. (FIGS. 2 and 3).

The cylindrical face 56 has a cylinder axis X-X which is perpendicular to the longitudinal faces 60, 62 of the set 37 of elementary elements and which is parallel with the lateral faces 64, 66 of the set 37 of elementary elements.

During a step 70, the set 37 is magnetized by a device which is capable of applying to set 37 a large magnetic field.

The magnetization of a set is advantageously carried out at this stage, because it is not possible to do it when the poles are constituted on the rotor owing to the dimensions of the rotor and the poles, and the energy levels to be involved in the magnetization.

The set 37 is magnetized in such a manner that the magnetic axis generated by magnetization extends parallel with the longitudinal faces 46, 48 of the elementary elements 38, 40 which constitute it.

During the step 70, only the set 37 is magnetized, that is to say that the set is not magnetized with the hub 20 or with a support for receiving the set 37.

The set 37 constituted in this manner forms a continuous assembly (without faults) of permanent magnets which are secured to each other with an insulating sheet being interposed.

Since the set 37 constitutes only a portion of the pole 2 which extends in accordance with the width of the pole, the size of the set 37 is sufficiently small for a commercially available magnetization device to be able to magnetize it.

During a step 71, an insulating sheet 32 is adhesively bonded to the bottom wall 34 of the recess 22. At the step 72, the planar main face 58 of the magnetized set 37 is adhesively bonded to the insulating sheet 32. The set 37 is positioned in such a manner that its longitudinal face 60 forms the lateral face of the magnetic pole 2.

The height of the set 37 corresponds to the depth of the recesses 22, 24 so that the cylindrical shape of the machined face 56 corresponds to the cylindrical shape of the hub 20.

Subsequently, the steps 36 to 72 are repeated in order to construct and fix three other magnetized sets 74, 76, 78 in the recess 22 with an insulating sheet 32 being interposed. The magnetized sets 37, 74, 76, 78 from the whole of the magnetic pole 2.

The magnetized sets 37, 74, 76 and 78 which are fixed in the same recess 22 all have the same polarities.

Subsequently, four magnetized sets having opposite polarities are constructed and adhesively bonded in the recess 24 with an insulating sheet 32 being interposed adjacent to the recess 22 in order to construct a new magnetic pole 4.

When the assembly of the magnetic poles is constructed on the hub 20, during a step 75, an insulating sheet 32 is adhesively bonded to the assembly of the rotor 6 which is provided with the magnetic poles formed in this manner. That insulating sheet prevents short-circuits between the poles.

Finally, a retaining ring 79 for maintaining the magnetic poles 2, 4 is mounted around it during a step 80.

The retaining ring is constructed from a composite material, such as, for example, glass, carbon and aramide fibers which are known under the name Kevlar (registered mark).

The insulating sheet 32 is adhesively bonded to the assembly of the magnetic poles during the step 75 only when the retaining ring is constructed from a non-insulating material, typically carbon fibers.

In a variant, the recesses 22 and 24 have a small depth of, for example, from 1 to 2 mm and interpolar blocks are interposed between each magnetic pole.

In a variant, the insulating sheet 32 may be replaced with an adhesive which is charged with solid particles which are electrically non-conductive or an adhesive which is charged with material fibers which are electrically non-conductive.

The insulating sheet 32 which is interposed between the magnetized sets 74, 76, 78 may be constructed from a material different from that of the insulating sheet 32 which is fixed between the elementary elements 38, 40.

In a variant, the insulating sheet 32 may not be adhesively bonded to the assembly of the rotor 6, but instead may be adhesively bonded only to each magnetic pole 2, 4.

In a variant, the elementary elements 38, 40 may have a different height in order to minimize the quantity of material to be removed during the machining step 68.

In another variant, the elementary elements may have different heights and each may have a main face 42 which forms a portion of the cylindrical surface so that it is not necessary to machine the main face 56 of the set 37 of elementary elements.

In another variant, the elementary elements may be of a parallelepipedal shape having a main face having a width and length which are equal to those of the magnetic pole, but having a height which is less than it. In this embodiment, the magnetic pole is formed by stacking in accordance with the axis of the rotor of elementary elements.

Advantageously, the surrounding insulating sheet 32 may facilitate the mounting of the retaining ring 79.

Advantageously, the method may be applied in order to construct any rotor of a synchronous electrical rotating machine in which it is necessary to reduce the electrical losses which arise from the eddy current which is induced by the magnetic fluxes which pass between the stator and the rotor.

In particular, the method according to the invention may be applied in order to construct the rotor of motors of which the diameter of the rotor is greater than 100 mm, or high-power motors (power greater than 50 KW).

Advantageously, it may be simple to adhesively bond the elementary elements 38, 40 to each other before they are magnetized. In this manner, the mounting of a magnetic pole is simpler and more rapid.

Advantageously, the elementary elements are fixed to each other over the entire surface thereof so that the elementary elements form a monobloc assembly which does not include any gaps or fissures between the elementary elements. Thus, the magnetic pole constituted in this manner better withstands the mechanical pressures which are generated by the motor torque when the rotor is rotated.

Advantageously, the outer face of the magnetic pole 2 formed in this manner may be completely cylindrical.

Advantageously, this mounting method may allow rotors to be constructed more cheaply.

More generally, the invention provides an electric motor which includes a rotor as illustrated in FIGS. 1 and 2, having a hub 20 on which magnetic poles are constructed in accordance with the method described above.

What is claimed is:

1. A method for mounting at least one magnetic pole of a rotor for a synchronous electrical rotating machine from a set of elementary elements, the rotor comprising a hub which has a cylindrical outer shape having a predefined radius, the method comprising the steps of:
   a) forming the set of elementary elements of rectangular parallelepipedal shape by fixing at least two elementary elements to each other with an electrical insulator interposed therebetween, the set of elementary elements being magnetizable;
   b) machining a main face of the set of elementary elements in order to form a cylindrical face having a radius substantially equal to the predefined radius of the hub;
   c) magnetizing the set of elementary elements; and
   d) fixing the set of elementary elements to the hub, the set of elementary elements forming at least a portion of the magnetic pole.

2. The method according to claim 1, wherein the cylindrical face has a cylinder axis, the axis being perpendicular to the longitudinal faces of the set of elementary elements and parallel with the lateral faces of the set of elementary elements.

3. The method according to claim 1, wherein the at least two elementary elements are fixed to each other by an adhesive and the electrical insulator is an electrically insulating sheet.

4. The method according to claim 1, wherein the at least two elementary elements are fixed to each other by means of an adhesive which is charged with solid particles or an adhesive which is charged with non-conductive material fibers, the adhesive forming the electrical insulator.

5. The method according to claim 1, wherein the steps a) to d) are repeated in order to obtain a plurality of sets of elementary elements, the sets of elementary elements being fixed to the hub beside each other with an electrical insulator being interposed therebetween, a longitudinal face of a set of elementary elements forming a lateral face of the magnetic pole.

6. The method according to claim 1, further comprising a step of fixing an electrical insulator to the hub, the electrical insulator being interposed between the hub and the set of elementary elements.

7. The method according to claim 1, further comprising a step of fixing an electrical insulator to the cylindrical face of the set of elementary elements.

8. The method according to claim 1, wherein the set of elementary elements includes from 2 to 20 elementary elements.

* * * * *